Patented Nov. 20, 1928.

1,692,492

UNITED STATES PATENT OFFICE.

HEINZ EICHWEDE, ERICH FISCHER, AND CARL ERICH MÜLLER, OF HOCHST-ON-THE-MAIN, GERMANY, ASSIGNORS TO GRASSELLI DYESTUFF CORPORATION, OF NEW YORK, N. Y., A CORPORATION OF DELAWARE.

PROCESS OF DYEING CELLULOSE DERIVATIVES.

No Drawing. Application filed December 23, 1925, Serial No. 77,399, and in Germany January 9, 1925.

Our present invention relates to a process for dyeing cellulose derivatives, especially cellulose esters or ethers. For purposes of this invention we will call such cellulose derivatives compounds of the group including cellulose esters and cellulose ethers. We have found that for this purpose monoazo dyestuffs, containing as coupling component an ortho-aminophenolether or a homologue or substitution product thereof capable of being coupled, are eminently suitable. The diazo compounds to be used may be of any kind, but they must not contain more than one single sulfo group. As all the dyestuffs in question still have a free amino group, they may, of course, also be diazotized directly on the fibre and subsequently treated in the usual manner by a developing agent.

The following examples serve to illustrate our invention:

(1) 1 kilo of acetate silk is dyed for ¾ to 1 hour at 60–70° C. in a dye-bath of 20–25 litres in which 20 grams of the dyestuff: 2-chlorobenzene-5-sulfonic acid-1-azo-3-amino-4-cresol-methylether $$(NH_2:OCH_3:CH_3=3:4:1)$$

having most probably the formula:

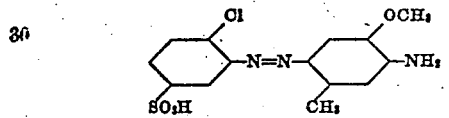

are dissolved, with or without the addition of a salt or acid or with or without the addition of a protective colloid. The dyestuff thus obtained gives on acetate silk a deep yellow tint having excellent properties as to fastness.

(2) If for the dyestuff used according to Example 1 is substituted the dyestuff: 4-nitrobenzene-3-sulfonic acid-1-azo- -amino-4-cresolmethylether, an orange tint of great fastness is obtained.

(3) 1 kilo of acetate silk is dyed at 60–70° C. for ¾ to 1 hour in a dye bath of 20–25 litres in which 20 grams of the dyestuff: nitro-4-aminobenzene-1-azo-3-amino-4-cresolmethylether are dissolved, either in the form of its hydrochloride or in a colloidal form, in presence or absence of a salt. In this manner a beautiful orange tint of good fastness is obtained.

When using the dyestuff: 3-nitrobenzene-4-sulfonic acid-1-azo-4-chloro-2-amino-1-phenolmethylether, a deep golden-yellow tint is obtained, whereas the dyestuff: 2-methylbenzene-5-sulfonic acid-1-azo-3-amino-4-cresol-methylether gives a pure greenish-yellow tint.

In the following claims we understand by the term "ortho-aminophenolether" also the homologues or substitution products of this compound in so far as they are capable of being coupled with diazo compounds.

We claim:

1. Process of dyeing compounds of the group including cellulose esters and cellulose ethers consisting in using for the dyeing process monoazo dyes obtainable by coupling a diazo compound containing at the most one sulfo group with an ortho-aminophenolether.

2. Process of dyeing compounds of the group including cellulose esters and cellulose ethers consisting in using for the dyeing process monoazo dyes obtainable by coupling a diazo compound containing at the most one sulfo group with 3-amino-4-cresol-methylether $$(NH_2:OCH_3:CH_3=3:4:1).$$

3. Process of dyeing compounds of the group including cellulose esters and cellulose ethers consisting in using for the dyeing process the monoazo dye obtainable by coupling diazotized 2-chloro-1-aminobenzene-5-sulfonic acid with 3-amino-4-cresolmethylether.

4. Compounds of the group including celulose esters and cellulose ethers dyed with monoazo dyes obtainable by coupling a diazo compound containing at the most one sulfo group with an ortho-aminophenolether.

5. Compounds of the group including cellulose esters and cellulose ethers dyed with monoazo dyes obtainable by coupling a diazo compound containing at the most one sulfo group with 3-amino-4-cresolmethylether (NH$_2$:OCH$_3$:CH$_3$=3:4:1).

6. Compounds of the group including cellulose esters and cellulose ethers dyed with the monoazo dye obtainable by coupling diazotized 2-chloro-1-aminobenzene-5-sulfonic acid with 3-amino-4-cresolmethylether.

In testimony whereof, we affix our signatures

HEINZ EICHWEDE.
ERICH FISCHER.
CARL ERICH MÜLLER.